United States Patent [19]

Eple et al.

[11] Patent Number: 5,975,616
[45] Date of Patent: Nov. 2, 1999

[54] SUN VISOR FOR VEHICLES

[75] Inventors: Pascal Eple, Stromy; Didier Jacquemin, Luxeuil les Bains, both of France

[73] Assignee: Becker Group Europe GmbH, Wuppertal, Germany

[21] Appl. No.: 08/992,065

[22] Filed: Dec. 17, 1997

[30] Foreign Application Priority Data

Dec. 17, 1996 [DE] Germany .......................... 196 52 495

[51] Int. Cl.[6] .......................................................... B00J 3/00
[52] U.S. Cl. .............................................................. 296/97.1
[58] Field of Search ............................................ 296/97.1

[56] References Cited

U.S. PATENT DOCUMENTS 1,989,929   2/1935   Jacobs ..................................... 296/97.1
4,890,875   1/1990   Takahashi ............................... 296/97.1

FOREIGN PATENT DOCUMENTS

| 0 193 150 A2 | 9/1986 | European Pat. Off. . |
| 0 202 398 A2 | 11/1986 | European Pat. Off. . |
| GM 1774661 | 9/1958 | Germany . |
| GM 1840799 | 11/1961 | Germany . |
| 94 12 656 U | 12/1994 | Germany . |

*Primary Examiner*—Gary C. Hoge
*Attorney, Agent, or Firm*—Harness, Dickey & Pierce, P.L.C.

[57] ABSTRACT

A sun visor for vehicles with a sun visor body, a support shaft and a bracket is described, which is distinguished in that the sun visor body consists of a thin plate body and a peripheral frame strip supporting the plate body.

3 Claims, 1 Drawing Sheet

SUN VISOR FOR VEHICLES

FIELD OF THE INVENTION

The invention relates to a sun visor for vehicles, with a sun visor body, a support shaft and a bracket.

BACKGROUND OF THE INVENTION

The sun visors for vehicles which presently are customarily used, have a relatively large-dimensioned sun visor body of great weight and of a complicated design. In connection with a first conventional type of embodiment, a support body for the support shaft is initially welded to an insert body, frequently consisting of a wire frame. Cut-to-size pieces made of plastic foam are then placed on both sides of the insert body, and on top of that cut-to-size plastic pieces, which are welded together along their circumference. With another conventional type of embodiment, a wire frame equipped with a support body is placed into the mold depression of a foam mold, and PU, but lately also EPP, is foamed around it. This blank is then covered with plastic foil or cut-to-size textile materials.

OBJECT AND SUMMARY OF THE INVENTION

Accordingly, it is the object of the instant invention to provide a sun visor of the type mentioned at the outset, whose sun visor body can be produced simply and cost-effectively, completely meets esthetic demands and is furthermore intended to be distinguished by having only an extremely low weight.

For the attainment of this object it is provided by the invention that the sun visor body consists of a thin plate body and a peripheral frame strip supporting the plate body.

By a thin plate body it is intended to be understood that its wall thickness is reduced by 50 to 75% and possibly more, in comparison to conventional sun visor bodies. Such a plate body can be of very low weight and does not require an insert for placement therein, because its support is provided by the peripheral frame strip holding it. However, the frame strip should be approximately matched in its thickness to a conventional sun visor, so that it can be correctly grasped by the hand and can also meet the requirements for stability. The sun visor of the invention can be made available in the form of a sun visor body which is designed to be sufficiently light so that the attachment of an otherwise required auxiliary support shaft can be omitted. With this, the production, stocking and assembling of an otherwise required counter-support bracket can also be omitted.

In one embodiment of the invention it can be provided that the peripheral frame strip is embodied as a hollow injection-molded plastic element with a grained surface. The hollow embodiment of the peripheral frame strip results in the advantage of even further weight and material savings, while the grained surface promotes the good looks of the sun visor.

In accordance with a further advantageous embodiment of the invention, the peripheral frame strip is made of a thermoplastic material and is produced in accordance with the internal gas pressure method, or other like methods, such as injection blow-molding. An extremely economical manufacture is assured by this, in that a gas is forced into the interior of the frame body by means of an injector, so that a hollow space is created, and in the process a shape is created which has an outstanding surface quality without any sink marks at all.

The visual appearance of the sun visor can be positively affected in that the peripheral frame strip is preferably embodied to be tube-shaped and has a circular cross section.

In accordance with a first preferred further embodiment of the invention it can be provided that the sun visor body consists of a one-piece plastic injection-molded body, wherein the peripheral frame strip formed on the plate body has been produced in accordance with the internal gas pressure method. In this way, the sun visor body has a design made of one piece which, in addition, is also uniform as to its material. This design can further be completed in that the exterior surfaces of the plate body are made grained, which can be realized without problems by means of an appropriate treatment of the injection molding tool. It is obvious that with a sun visor body designed in this way it is possible to omit its covering with a plastic, foil or textile material.

In accordance with a second preferred further embodiment of the invention, the plate body has a sandwich-like structure with a center layer of paperboard or cardboard and exterior layers of a plastic or textile material, wherein the plastic material constituting the peripheral frame strip is injected in accordance with the internal gas pressure method around the plate body. A sun visor designed in this way has a particularly good and elegant appearance and therefore can also satisfy higher demands, in particular if in accordance with a further development a cushion layer respectively made of a plastic foam material is disposed between the center layer of paperboard or cardboard and the outer layer of a plastic or textile material.

Exemplary embodiments will be described in more detail below by means of the drawings.

DETAILED DESCRIPTION OF THE PREFERRED EMBODIMENTS

Figure 1:
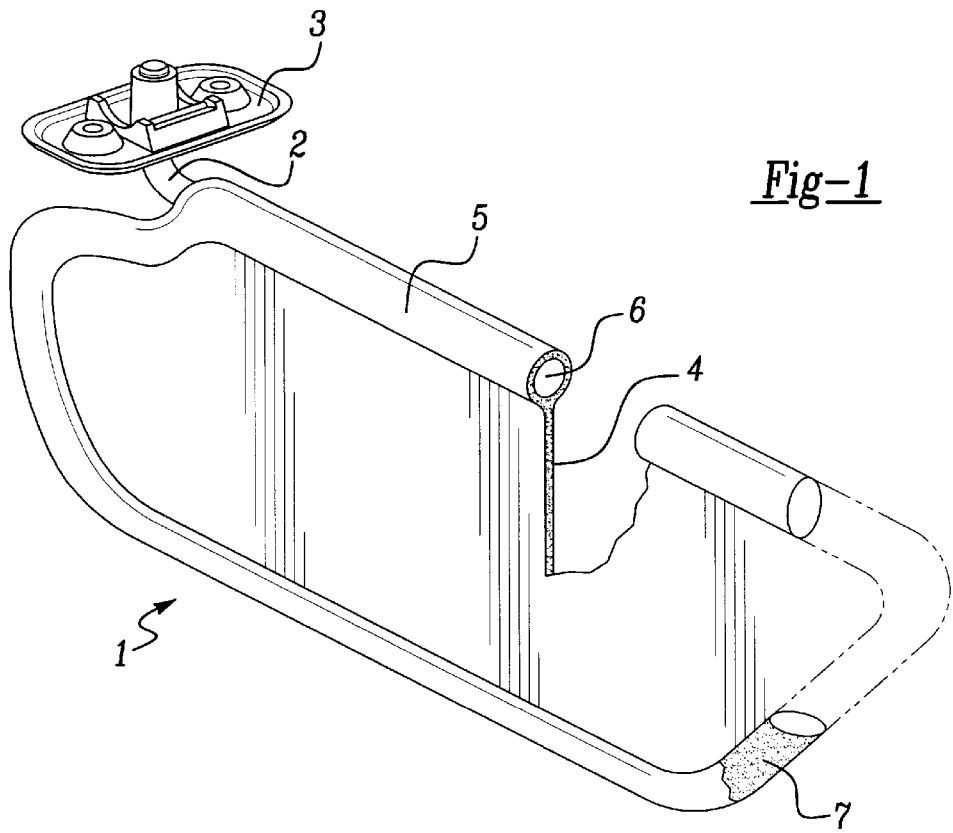
FIG. 1 shows a first sun visor designed in accordance with the invention.
Figure 2:
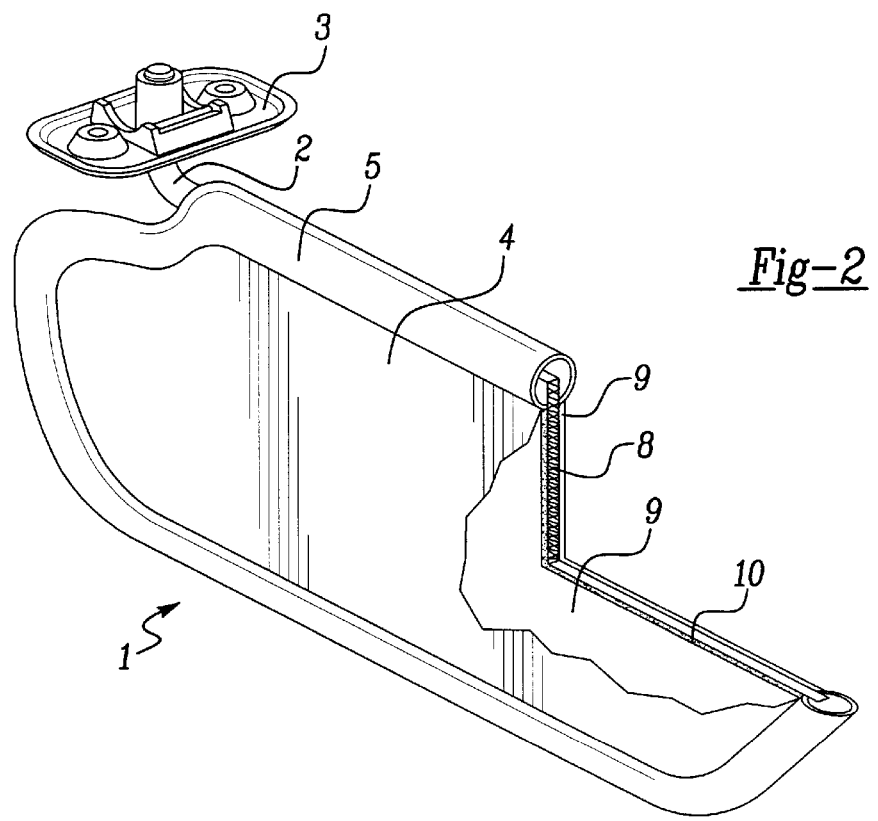
FIG. 2 shows a second sun visor designed in accordance with the invention.

The novel sun visor in accordance with FIGS. 1 and 2 consists of a sun visor body 1, a support shaft 2 engaging it with its end section, and a support bracket 3 which receives the other end area of the support shaft 2 and is fastened in the customary manner on a vehicle body.

The sun visor body 1 consists of a thin plate body 4 and a peripheral frame strip 5 supporting the plate body 4. While the plate body 4 in accordance with FIG. 1 is solidly embodied, the frame strip 5 is hollowly embodied in the manner of a round tube.

In the exemplary embodiment in accordance with FIG. 1, the sun visor body 1 is made of one piece and of the same material and consists of an injection-molded plastic element. As mentioned and as can be seen from the drawings, a hollow space 6 is provided in the interior of the peripheral frame strip 5. The sun visor body 1 is produced in accordance with the plastic injection-molding process and, regarding the frame strip 5, in accordance with the internal gas pressure method, wherein a gas is forced into the mold by means of an internal gas pressure injector through an opening which should coincide with the support shaft 2, so that the hollow space 6 can form inside the heated thermoplastic material located in the mold. The formation of the exterior shape of the frame strip 5 takes place simultaneously with forcing the gas in. In the course of shaping, at least the frame strip 5, but preferably also the plate body 4, are provided with a grain 7.

With the novel sun visor in accordance with FIG. 2, the plate body 4 is not an injection-molded plastic element, but a sandwich-like flat structure. The plate body 4 has a center layer 8 made of a stiff lightweight material, preferably a paper material, such as paperboard, cardboard and the like, and connected with it, exterior layers 9 made of plastic foils, textile material, or a plastic/textile composite and the like. The exterior layers 9 can be glued together with the center layer 8. For achieving a soft touch, cushion layers 10 made from foamed plastic, for example, can be respectively arranged between the center layer 8 and the exterior layers 9.

The sandwich-like flat structure is placed into the mold depression of an injection-molding machine, after which the peripheral frame strip is formed around its edge area, preferably in accordance with the already described internal gas pressure method.

Of course, it should be understood that changes and modifications can be made to the preferred embodiments described above. It is therefore intended that the foregoing detailed description be regarded as illustrative rather than limiting, and that it be understood that it is following claims, including all equivalents, which are intended to define the scope of this invention.

What is claimed is:

1. A sun visor for vehicles comprising a sun visor body, a support shaft and a bracket, wherein the sun visor body comprises a one piece element having a thin plate body and a peripheral frame strip supporting the plate body, wherein the peripheral frame strip is hollow, and wherein the peripheral frame strip includes a grainy surface.

2. A sun visor for vehicles comprising a sun visor body, a support shaft and a bracket, wherein the sun visor body comprises a thin plate body and a peripheral frame strip supporting the plate body, the plate body further comprising a center layer made of a paper material arranged between a bottom exterior and a top exterior layer made of a material selected from a plastic, a textile, or composite thereof, and the peripheral frame strip is made from a plastic material molded around the plate body.

3. The sun visor in accordance with claim 2, wherein the plate body further comprises at least one cushion layer arranged between the center layer and at least one exterior layer.

* * * * *